United States Patent [19]

Ng et al.

[11] Patent Number: 4,698,782
[45] Date of Patent: Oct. 6, 1987

[54] ELECTRONIC WORKSTATION WITH PARKABLE KEYBOARD

[75] Inventors: Edward C. Ng, San Jose, Calif.; William M. Casnovsky, Austin, Tex.

[73] Assignee: Motorola Computer Systems, Inc., Cupertino, Calif.

[21] Appl. No.: 636,533

[22] Filed: Aug. 1, 1984

[51] Int. Cl.⁴ .................... G06F 1/00; F16M 11/00
[52] U.S. Cl. ................................. 364/708; 364/709; 248/176
[58] Field of Search ...................... 364/708, 709; 340/365 R, 365 S; 248/1 A-1 J, 442.2; 108/143; 379/96, 110

[56] References Cited

U.S. PATENT DOCUMENTS

| | | | |
|---|---|---|---|
| 3,588,875 | 6/1971 | Gabor | 340/365 S |
| 4,326,193 | 4/1982 | Markley et al. | 340/365 R |
| 4,379,336 | 4/1983 | Yamamoto et al. | 340/708 |
| 4,475,164 | 10/1984 | Sado | 364/708 |
| 4,496,200 | 1/1985 | Hagstrom et al. | 248/1 B |
| 4,527,149 | 7/1985 | Swensen | 340/365 R |
| 4,595,993 | 6/1986 | Yao | 364/708 |

FOREIGN PATENT DOCUMENTS

| | | | |
|---|---|---|---|
| 8403573 | 9/1984 | European Pat. Off. | 248/1 B |
| 2847135 | 5/1980 | Fed. Rep. of Germany | 248/1 B |
| 3132015 | 10/1982 | Fed. Rep. of Germany | 248/1 B |
| 0111936 | 9/1981 | Japan | 340/365 R |

OTHER PUBLICATIONS

Edwards, "A Keyboard for your Data Terminal" *Electronics* Australia Apr. 1978 vol. 40, #1 pp. 48-56.
Davis, Jr., "Adapter Shelf", *IBM Technical Disclosure Bulletin*, vol. 22, #7, pp. 2631-2632 Dec. 1979.
*Republic Scene* Oct. 1983.

*Primary Examiner*—Gary V. Harkcom
*Assistant Examiner*—Dale M. Shaw
*Attorney, Agent, or Firm*—Walter W. Nielsen

[57] ABSTRACT

An electronic workstation comprising a detachable keyboard (10, FIG. 1) associated with the workstation for permitting operator interface to same. The workstation comprises a base (2) with an upper surface (15) inclined towards the operator, a viewable element (8) such as a CRT screen, and a support (4,6) for supporting the viewable element relative to the base. The keyboard 10 is positionable by the operator in any of several orientations relative to the base 2. In one orientation the keyboard is fully incumbent upon the base, thereby maintaining the workstation profile or "footprint" relative to a work surface (30) at a minimum. In another orientation the keyboard rests only partially on the work surface. Protuberances (24, 34) on the upper surface of the base register with corresponding indentations in the lower surface of the keyboard to facilitate locking the keyboard in the desired position relative to the base. In addition, folding legs (20) are provided at the rear of the keyboard to enable the angle of the keyboard relative to the work surface to be changed to suit the operator's individual requirements. The folding legs also register with the corresponding protuberances to maintain the keyboard in the desired position.

12 Claims, 5 Drawing Figures

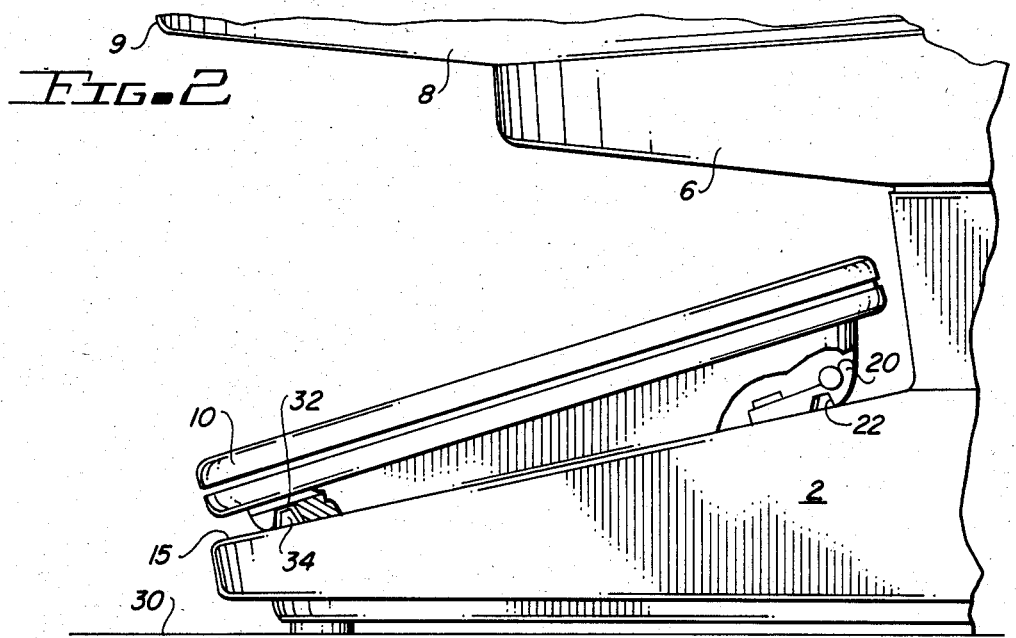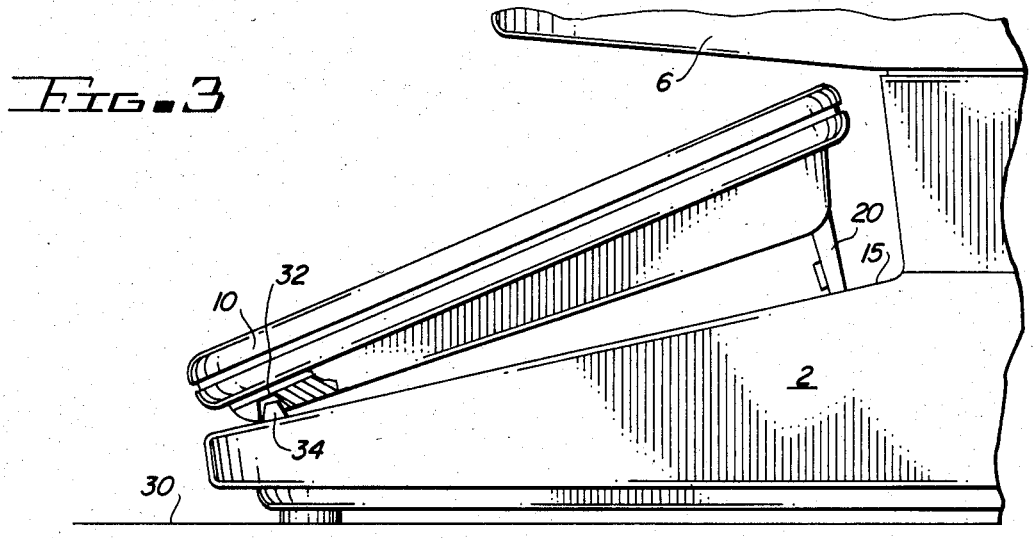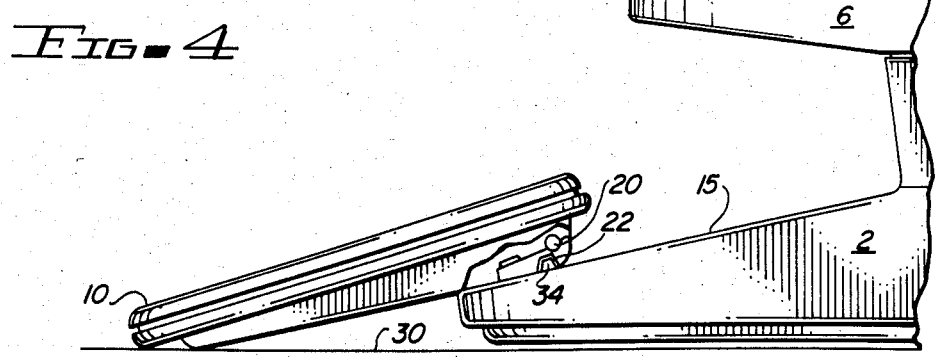

ELECTRONIC WORKSTATION WITH PARKABLE KEYBOARD

TECHNICAL FIELD

This invention relates generally to the field of data processing, and, in particular, to an electronic workstation having a keyboard which may be positioned in several possible orientations by an operator and having a minimal profile relative to the operator's work surface.

BACKGROUND OF THE INVENTION

The use of electronic workstations, for example computer workstations, by people of all interests is rapidly proliferating. Where once such workstations were used primarily by people whose responsibilities were essentially limited to dedicated word-processing or data-processing, the current trend is for use of workstations on an intermittent basis by a wide spectrum of people in offices, businesses, schools, and homes for many different purposes.

Existing workstations tend to be rather large, bulky pieces of equipment which occupy substantially all of an operator's usable work surface. As more diverse types of people use electronic workstations, there is an urgent need for a workstation having a minimum profile relative to the operator's work surface, to permit the operator to use the work surface for activities other than operating the workstation.

For example, a professional person, such as a doctor, attorney, stock broker, banker, insurance executive, or patent examiner, may use a workstation for only 10% of his business day and otherwise require a spacious, orderly work surface for reviewing and storing paper documents, files, and other work-related items.

Ergonomic studies have also shown that electronic workstation operators are susceptible to fatigue in their eyes, arms, shoulders, and back, and to other maladies, particularly if the workstation can only be oriented in a single position. Accordingly, there is also a need to provide workstations in which the keyboard and video display unit (VDU) can be easily adjusted by the operator to a variety of positions.

It is known to provide an electronic workstation which has a keyboard that may be positioned beneath the base of the workstation by the operator to minimize the workstation profile when the operator is not using the workstation. However in such position the keyboard is not accessible for use by the operator. Workstations in which the keyboard may be positioned on top of the base and beneath the VDU are also known. However, regarding the latter workstations, they are either of a type in which the clearance between the base and VDU only allows for storage of the keyboard without allowing operator access to any keys, or of the type in which access to the keyboard by the operator is severely limited.

BRIEF SUMMARY OF INVENTION

Accordingly, it is an object of the present invention to provide an improved electronic workstation.

It is also an object of the present invention to provide an electronic workstation having a minimal profile upon the operator's work surface.

It is a further object of the present invention to provide an electronic workstation comprising a keyboard positionable by the operator in any of several orientations, at least one of which has a minimal profile upon the operator's work surface.

These and other objects are achieved in accordance with a preferred embodiment of the invention by providing an electronic workstation operable by an operator and comprising a base resting upon a work surface and having an upper surface inclined at an angle towards the operator, an element viewable by the operator for conveying information from the workstation to the operator and comprising a support for supporting the viewable element relative to the base, the improvement comprising, a keyboard for use by the operator in communicating with the workstation, the keyboard being of such length and width, relative to the upper surface of the workstation, that such keyboard may be positioned on the base upper surface so that the projection of the keyboard upon the work surface is minimized, and the keyboard being of such thickness, relative to the distance between such viewable element and the base, that operator access to substantially all keys on the keyboard is provided.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 2 shows a right-hand view of the parkable keyboard in a first orientation.

FIG. 3 shows a right-hand view of the parkable keyboard in a second orientation.

FIG. 4 shows a right-hand view of the parkable keyboard in a third orientation.

DETAILED DESCRIPTION OF THE INVENTION

Figure 1:
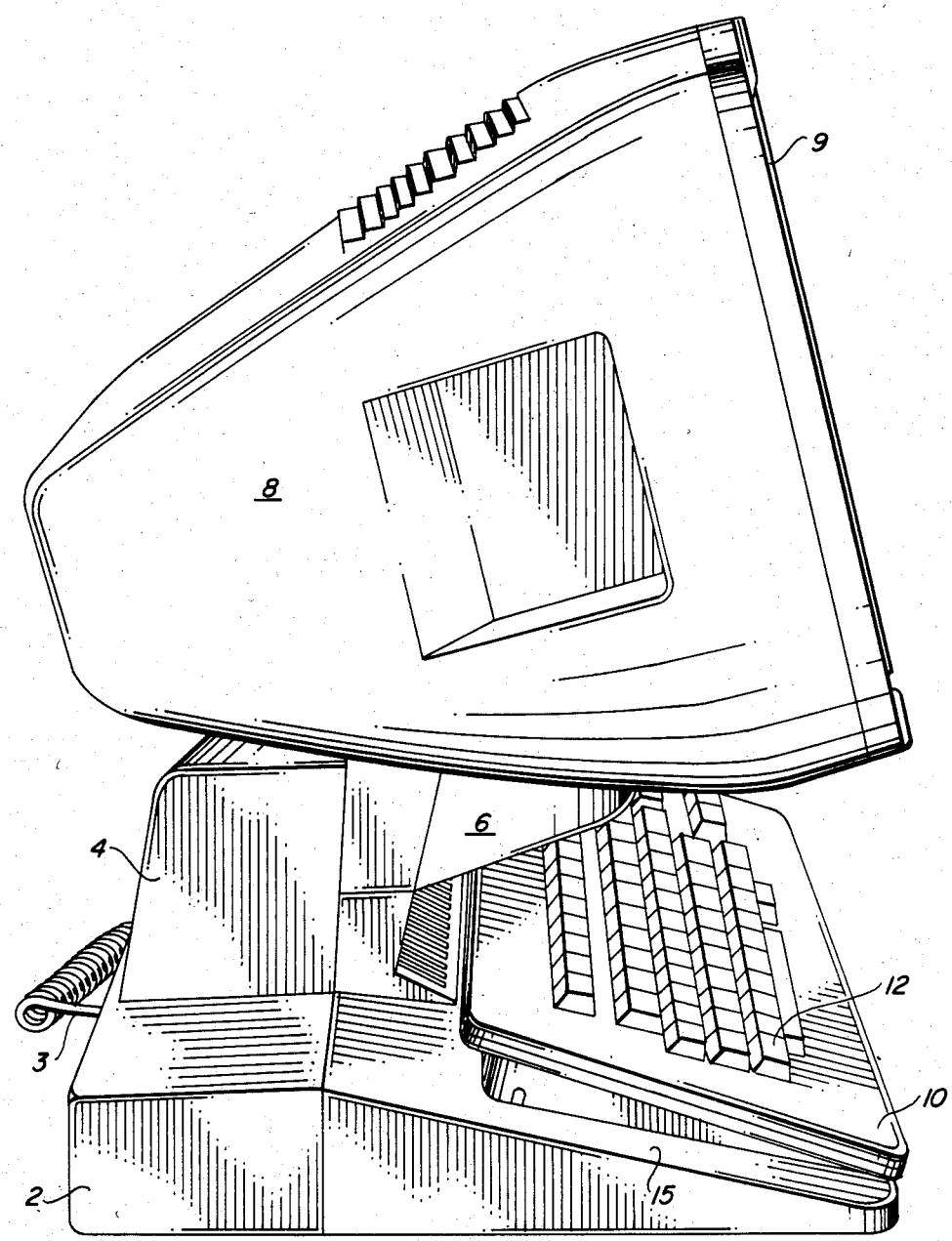
FIG. 1 shows a left-hand view of a preferred embodiment of a computer workstation incorporating the parkable keyboard of the present invention.

Referring now to FIG. 1, a left-hand view of a preferred embodiment of a computer workstation incorporating the parkable keyboard of the present invention is shown. The workstation comprises a base 2 having an upper surface 15 angled towards the operator, and a video display unit (VDU) 8 having a viewable surface 9 viewable by the operator for conveying information from the workstation to the operator. The workstation also comprises a centrally located vertical support 4, and a centrally located cantilever arm 6, which together support the VDU 8 relative to the base 2. The VDU 8 is movable by the operator either up and down or from side to side relative to the support 4, to enable the operator to position the VDU as desired. Although VDU 8 is movable relative to the base 2, at least some portion of the viewable surface 9 is always substantially equidistant to the operator as the front edge of the base 2, as is shown in FIG. 1. A keyboard 10 is operatively connected to the electronic contents (not shown) of the base and/or VDU via connecting cord 3.

In FIG. 1, keyboard 10 is shown in a "fully parked" position. That is, the edge of keyboard 10 closest to the operator is directly above the forward edge of workstation base 2. In this position, the profile of keyboard 10 upon the work surface is minimized. The so-called "footprint" of the workstation in this configuration is identical to the area of base 2 which is in contact with the work surface.

FIGS. 2-5 illustrate in greater detail the means for orienting keyboard 10 relative to the workstation base 2. They further illustrate in detail a preferred embodiment of the means for elevating the rear of the keyboard 10 and the means for securing the keyboard 10 relative to the upper surface 15 of base 2.

Referring now to FIG. 2, a right-hand view of the parkable keyboard in a first orientation, corresponding to a "recumbent, fully parked" position, is shown. The lower surface of keyboard 10 is substantially in contact with the upper surface of base 2. Keyboard 10 is prevented from sliding down the upper surface 15 of base 2 by appropriate means, such as a small protuberance 34 in the upper surface 15 of base 2 which registers with a corresponding indentation 32 in the lower surface of keyboard 10. One or more additional protuberance/indentation pairs may be provided between the keyboard 10 and base 2, as required. Each protuberance 34 and indentation 22 is elongated in shape in a direction parallel to the front and rear edges of keyboard 10, as viewed by the operator.

Means for elevating the rear of keyboard 10 in the form of a folding leg 20, is shown in the folded position in FIG. 1. It will be understood that a pair of folding legs may be provided, one at either end of keyboard 10.

Referring now to FIG. 3, a right-hand view of the parkable keyboard in a second orientation, corresponding to an "elevated, fully parked" position, is shown. In this orientation the rear of keyboard 10 is elevated by extension of folding leg 20. Folding leg 20 is rotatable about a pivot pin (not shown) between a folded position, as depicted in FIG. 2, and the extended position shown in FIG. 3. In the "elevated, fully parked" position of keyboard 10 shown in FIG. 3, protuberance 34 registers with corresponding indentation 32 in the lower surface of keyboard 10.

Referring now to FIG. 4, a right-hand view of the parkable keyboard in a third orientation, corresponding to a "recumbent, half-parked" position, is shown. In this orientation the folding legs at the rear of keyboard 10 are in the folded position. An indentation 22 in the lower surface of each folding leg 20 mates with a corresponding protuberance 34 to secure the keyboard 10 to the upper surface 15 of base 2. The lower edge of keyboard 10 nearest the operator rests upon work surface 30.

Figure 5:
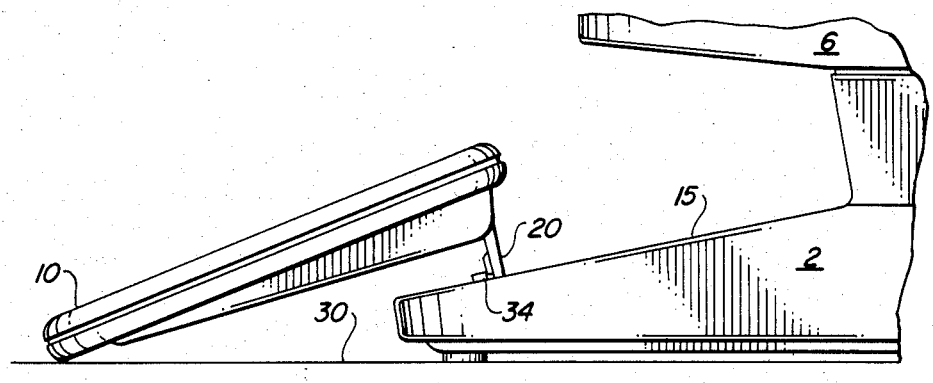
FIG. 5 shows a right-hand view of the parkable keyboard in a fourth orientation.

Referring finally to FIG. 5, a right-hand view of the parkable keyboard in a fourth orientation, corresponding to an "elevated, half-parked" position, is shown. In this orientation the folding leg 20 at the rear of keyboard 10 is in the extended position and rests against the protuberance 34 on the upper surface of base 2 to secure the keyboard 10 from moving forward relative to the base 2.

It will be apparent to those skilled in the art that the disclosed electronic workstation may be modified in numerous ways and may assume many embodiments other than the preferred form specifically set out and described above.

For example, while the keyboard illustrated in the preferred embodiment is depicted as being connected to the base by a coiled cord, the keyboard could communicate with the base in an alternative manner, for example by infrared transmission. Also the length and width of the keyboard need not necessarily be similar to the dimensions of the upper surface 15 of the base 2. In addition, alternative means for securing the keyboard 10 relative to the base upper surface 15 and for elevating the rear of the keyboard 10 may be provided. Furthermore, while the preferred embodiment of the invention illustrates the viewable element 8 (i.e., VDU) as being separated from the base 2 by a support means 4, and the viewable element 8 as being movable by the operator either up and down or from side to side relative to the support 4, it would be obvious to provide a viewable element 8 which is rigidly secured to the support 4 and which is adjustable relative to the base 2.

Accordingly, it is intended by the appended claims to cover all modifications of the invention which fall within the true spirit and scope of the invention.

What is claimed is:

1. In an electronic workstation operated by an operator and comprising a base resting upon a work surface and having an upper surface inclined at an angle towards the operator and having a front edge thereof which is close to the operator, an element having a surface viewed by the operator for conveying information from the workstation to the operator, at least a portion of said element surface being substantially equidistant from the operator as the front edge of the base, and a support for supporting the viewed element relative to the base, the improvement comprising:

a keyboard for use by the operator in communicating with the workstation, the keyboard having a front edge therefor which is close to the operator, the keyboard being of such length and width, relative to the upper surface of the base, as to enable said keyboard to be positioned in contact with substantially all of the base upper surface so that the front edge of the keyboard projects upon the base upper surface, thereby minimizing the projection of the keyboard upon the work surface, and the keyboard being of such thickness, relative to the distance between such viewed element and the base upper surface, that operator access to all keys on the keyboard is provided.

2. The electronic workstation recited in claim 1, wherein the length and width of the keyboard are substantially the same as the length and width of the base upper surface.

3. The electronic workstation recited in claim 2, wherein the thickness of the keyboard, when it is fully positioned upon the base upper surface, relative to the distance between the base upper surface and the lower surface of the viewed element is such as to allow the operator to have access to all keys on the keyboard.

4. The electronic workstation recited in claim 1, and further comprising means for securing the keyboard relative to the base upper surface.

5. The electronic workstation recited in claim 4, wherein the securing means comprises at least one protuberance on the base upper surface and at least one corresponding depression in the bottom surface of the keyboard, whereby the protuberance may be positioned within the depression to secure the keyboard relative to the base upper surface.

6. The electronic workstation recited in claim 1, wherein the keyboard further comprises means for elevating the rear of the keyboard.

7. The electronic workstation recited in claim 6, and further comprising at least one indexing means on the base upper surface, whereby the elevating means may be positioned relative to the indexing means to secure the keyboard relative to the base upper surface.

8. The electronic workstation recited in claim 1, wherein the angle of the base upper surface is such that the keyboard may be so positioned on the base upper surface that the bottom edge of the keyboard nearest the operator rests upon the work surface.

9. The electronic workstation recited in claim 8, and further comprising means for securing the keyboard relative to the base upper surface.

10. The electronic workstation recited in claim 9, wherein the securing means comprises at least one protuberance on the base upper surface and at least one corresponding depression in the bottom surface of the keyboard, whereby the protuberance may be positioned within the depression to secure the keyboard relative to the base upper surface.

11. The electronic workstation recited in claim 8, wherein the keyboard further comprises means for elevating the rear of the keyboard.

12. The electronic workstation recited in claim 11, and further comprising at least one indexing means on the base upper surface, whereby the elevating means may be positioned relative to the indexing means to secure the keyboard relative to the base upper surface.

* * * * *